US011891588B2

(12) United States Patent
Marquard

(10) Patent No.: US 11,891,588 B2
(45) Date of Patent: Feb. 6, 2024

(54) PERSONAL PROTECTIVE EQUIPMENT FREE DELIMER COMPOSITIONS O

(71) Applicant: ECOLAB USA INC., Saint Paul, MN (US)

(72) Inventor: Seth Louis Marquard, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 196 days.

(21) Appl. No.: 16/947,399

(22) Filed: Jul. 30, 2020

(65) Prior Publication Data

US 2021/0032573 A1 Feb. 4, 2021

Related U.S. Application Data

(60) Provisional application No. 62/881,057, filed on Jul. 31, 2019.

(51) Int. Cl.

| | |
|---|---|
| ***C11D 1/66*** | (2006.01) |
| ***C11D 3/20*** | (2006.01) |
| ***B08B 3/04*** | (2006.01) |
| ***B08B 3/08*** | (2006.01) |
| ***C11D 11/00*** | (2006.01) |
| ***C11D 3/04*** | (2006.01) |

(52) U.S. Cl.

CPC .............. *C11D 3/2086* (2013.01); *B08B 3/08* (2013.01); *C11D 1/66* (2013.01); *C11D 3/046* (2013.01); *C11D 3/2075* (2013.01); *C11D 3/2082* (2013.01); *C11D 11/0029* (2013.01)

(58) Field of Classification Search

CPC ......... C11D 1/66; C11D 3/046; C11D 3/2075; C11D 3/2082

USPC ......................... 510/238, 421, 477, 488, 509

See application file for complete search history.

(56) References Cited

U.S. PATENT DOCUMENTS

| | | | |
|---|---|---|---|
| 3,761,415 | A | 9/1973 | Gould |
| 4,083,407 | A | 4/1978 | Griffin, Jr. et al. |
| 4,102,400 | A | 7/1978 | Crinkelmeyer et al. |
| 4,140,649 | A | 2/1979 | Bossert et al. |
| 4,540,443 | A | 9/1985 | Barber |

(Continued)

FOREIGN PATENT DOCUMENTS

| | | | |
|---|---|---|---|
| BR | PI1002298 | A2 | 6/2012 |
| CN | 1703145 | A | 11/2005 |

(Continued)

OTHER PUBLICATIONS

International Searching Authority in connection with PCT/US2020/044271 filed Jul. 30, 2020, "International Search Report and Written Opinion", 12 pages, dated Oct. 20, 2020.

*Primary Examiner* — Gregory R Delcotto

(74) *Attorney, Agent, or Firm* — McKee, Voorhees & Sease, PLC

(57) ABSTRACT

General purpose liquid deliming compositions are disclosed. The compositions include acids, surfactants, and pH modifiers and are adjusted to a pH of 2 to 7. The composition may be used without personal protective wear or transportation restriction and demonstrate similar lime removal to other traditional lime removal compositions which are extremely low in pH and require protective gear by the user. The compositions also do not require the use of chelants, or builders for effective cleaning. Methods of using the deliming compositions are also disclosed.

17 Claims, 3 Drawing Sheets

(56) References Cited

U.S. PATENT DOCUMENTS

| | | | | |
|---|---|---|---|---|
| 4,980,152 | A | 12/1990 | Frazier et al. | |
| 5,468,303 | A | 11/1995 | Thomas, Sr. | |
| 6,350,251 | B1 | 2/2002 | Prosl et al. | |
| 8,092,584 | B2 | 1/2012 | Gunasekaran et al. | |
| 8,226,965 | B2 | 7/2012 | Baker, Jr. et al. | |
| 8,426,368 | B2 | 4/2013 | Haley et al. | |
| 8,747,911 | B2 | 6/2014 | Gupta et al. | |
| 8,962,026 | B2 | 2/2015 | Baker, Jr. et al. | |
| 9,072,781 | B2 | 7/2015 | Cuine et al. | |
| 9,144,606 | B2 | 9/2015 | Baker, Jr. et al. | |
| 9,216,178 | B2 | 12/2015 | Chou et al. | |
| 9,642,380 | B1 | 5/2017 | Mommer, Jr. et al. | |
| 9,907,824 | B2 | 3/2018 | Cifter et al. | |
| 9,962,628 | B2 | 5/2018 | Sheriff et al. | |
| 9,969,955 | B2 | 5/2018 | Smith et al. | |
| 2004/0106534 | A1 | 6/2004 | Nitsch et al. | |
| 2005/0155937 | A1 | 7/2005 | Zawada et al. | |
| 2006/0148837 | A1 | 7/2006 | Giordano et al. | |
| 2007/0160689 | A1 | 7/2007 | Giordano et al. | |
| 2008/0045431 | A1 | 2/2008 | Corradini | |
| 2008/0083071 | A1 | 4/2008 | Tremblay et al. | |
| 2009/0269394 | A1 | 10/2009 | Baker, Jr. et al. | |
| 2010/0075914 | A1 | 3/2010 | Flack et al. | |
| 2010/0226983 | A1 | 9/2010 | Sutcliffe et al. | |
| 2010/0234271 | A1* | 9/2010 | Scheuing | C11D 3/2065 510/465 |
| 2011/0009309 | A1* | 1/2011 | Mertens | C11D 3/3796 510/400 |
| 2012/0064136 | A1 | 3/2012 | Baker, Jr. et al. | |
| 2012/0202694 | A1 | 8/2012 | Dodd et al. | |
| 2012/0291815 | A1 | 11/2012 | Monsrud et al. | |
| 2012/0291818 | A1 | 11/2012 | Monsrud et al. | |
| 2013/0137618 | A1* | 5/2013 | Wood | C11D 1/65 510/109 |
| 2013/0146102 | A1 | 6/2013 | Monsrud et al. | |
| 2014/0174467 | A1 | 6/2014 | Larson, III et al. | |
| 2014/0174480 | A1 | 6/2014 | Larson, III et al. | |
| 2014/0302127 | A1 | 10/2014 | Dodd et al. | |
| 2018/0036743 | A1 | 2/2018 | Wilson et al. | |
| 2018/0208877 | A1 | 7/2018 | Mathews et al. | |

FOREIGN PATENT DOCUMENTS

| | | | | | |
|---|---|---|---|---|---|
| CN | 100497397 | C | | 6/2009 | |
| CN | 104383542 | A | | 3/2015 | |
| CN | 104529266 | A | | 4/2015 | |
| CN | 103664121 | B | | 10/2015 | |
| CN | 105031705 | A | | 11/2015 | |
| CN | 105126086 | A | | 12/2015 | |
| CN | 105695447 | A | | 6/2016 | |
| CN | 104477867 | B | | 8/2016 | |
| CN | 107049957 | A | | 8/2017 | |
| CN | 107290415 | A | | 10/2017 | |
| CN | 106531845 | B | | 2/2018 | |
| CN | 108342383 | A | | 7/2018 | |
| CN | 109210319 | A | | 1/2019 | |
| CN | 109239061 | A | | 1/2019 | |
| CN | 109265131 | A | | 1/2019 | |
| EP | 621335 | | * | 10/1994 | |
| EP | 1245247 | A1 | | 10/2002 | |
| EP | 0812808 | B1 | | 8/2003 | |
| EP | 1219581 | B1 | | 5/2005 | |
| EP | 2308463 | A1 | | 4/2011 | |
| EP | 1813665 | | * | 1/2012 | |
| EP | 1729768 | B1 | | 1/2018 | |
| EP | 3083665 | B1 | | 1/2018 | |
| GB | 2292563 | A | | 2/1996 | |
| HU | 210174 | B | | 2/1995 | |
| IN | 290367 | | | 4/2012 | |
| IN | 201717020372 | | | 11/2017 | |
| IN | 108101185 | A | | 6/2018 | |
| JP | 2002336362 | A | | 11/2002 | |
| JP | 201220125 | A | | 2/2012 | |
| KR | 1743508 | B1 | | 6/2017 | |
| MX | 359793 | B | | 10/2018 | |
| MX | 360019 | B | | 10/2018 | |
| PH | 12011502173 | | | 10/2010 | |
| TR | 201502081 | A | | 9/2016 | |
| TR | 201510399 | A | | 3/2017 | |
| TR | 201510664 | A1 | | 3/2017 | |
| TR | 201514015 | A | | 5/2017 | |
| TR | 201604137 | A | | 10/2017 | |
| WO | 8902274 | A1 | | 3/1989 | |
| WO | 9923194 | A1 | | 5/1999 | |
| WO | 0009643 | A1 | | 2/2000 | |
| WO | 0043475 | A2 | | 7/2000 | |
| WO | 0231095 | A1 | | 4/2002 | |
| WO | 2007141635 | A3 | | 12/2007 | |
| WO | WO-2009121682 | A1 | * | 10/2009 | C11D 11/0023 |
| WO | 2010036938 | A2 | | 4/2010 | |
| WO | 2010121322 | A1 | | 10/2010 | |
| WO | 2010121324 | A1 | | 10/2010 | |
| WO | 2012120337 | A1 | | 9/2012 | |
| WO | 2014140095 | A1 | | 9/2014 | |
| WO | 2016075269 | A1 | | 5/2016 | |
| WO | WO-2017157781 | A1 | * | 9/2017 | C11D 3/0068 |
| WO | 2018156501 | A1 | | 8/2018 | |

* cited by examiner

PERSONAL PROTECTIVE EQUIPMENT FREE DELIMER COMPOSITIONS O

CROSS-REFERENCE TO RELATED APPLICATION

This application claims priority under 35 U.S.C. § 119 to U.S. Provisional Application Ser. No. 62/881,057, filed on Jul. 31, 2019, which is herein incorporated by reference in its entirety including without limitation, the specification, claims, and abstract, as well as any figures, tables, or examples thereof.

FIELD OF THE INVENTION

The disclosure relates to liquid delimer and cleaning compositions, particularly compositions with appropriate pH and reduced free acid so that users do not have to wear personal protective equipment. The compositions are useful for removing hard water deposits and lime scale from machines which employ heat exchange systems and are non-Department of Transportation regulated. Applicants have surprisingly found that select acids and ratios of their conjugate bases can provide superior deliming and scale control even in the absence of chelants. The disclosure relates to general purpose deliming compositions, methods for manufacturing the same, and methods for using the same to remove hard water deposits and lime from hard surfaces.

BACKGROUND OF THE INVENTION

In recent years there has been an ever-increasing trend towards safer and sustainable cleaning compositions. This has led to the development of alternative complexing agents, builders, threshold agents, corrosion inhibitors, and the like, which are used instead of predominantly phosphorus containing compounds. Phosphates can bind calcium and magnesium ions, provide alkalinity, act as threshold agents, and protect alkaline sensitive metals such as aluminum and aluminum containing alloys.

In areas with an underlying geologic formation of limestone bedrock, the ground water is often classified as "hard". In 1977 the USGS studied the water quality across the United States and determined that half of the water samples were soft to moderately hard, and the other half were hard to very hard. In these "hard water" locations, the water is high in calcium and magnesium salts relative to other locales with "soft water" where the levels of these minerals are much lower. Alkaline detergents facilitate the removal of protein soils, starchy or sugary soils, fatty soils, and the like, where the soil may be burnt or baked on or otherwise thermally degraded. However, the alkaline nature of the detergent also raises the pH of the wash water and in the presence of calcium salts the elevated pH leads to the formation of calcium carbonate scale buildup. The solubility of calcium carbonate decreases rapidly with elevated temperature and elevated pH of the solution.

Regardless of machine type, over time, lime and/or scale deposits build up in commercial, institutional and consumer ware wash and laundry machines. The scales in the booster heater are formed from the water alone while the scales of the wash zone are formed from water and/or chemicals added to the water such as detergents, rinse aid, etc. It is desirable to timely remove such deposits through the use of a delime/descale operation in which a delime/descale chemical is delivered through the machine via the nozzle's sprays. For example, calcium carbonate precipitation on the surface of ware can negatively impact the aesthetic appearance of the ware, giving an unclean look. Additionally, the deposition of limescale onto the heating elements of the elements of a booster water heater diminish the efficacy of the heater to increase the temperature of the water and results in premature failure of the heating element.

The ability of NTA, EDTA and polyphosphates to remove metal ions facilitates the detergency of the solution by preventing hardness precipitation, assisting in soil removal and/or preventing soil redeposition during the wash process. While effective, phosphates and NTA are subject to government regulations due to environmental and health concerns. Although EDTA is not currently regulated, it is believed that government regulations may be implemented due to environmental persistence. There is a continuing need in the art for alternative, and preferably environment friendly, cleaning composition that can reduce the content of phosphorus-containing compounds such as phosphates, phosphonates, phosphites, and acrylic phosphinate polymers, as well as persistent aminocarboxylates such as NTA and EDTA.

Threshold agents are often used in cleaners because of their ability to solubilize and/or prevent calcium and magnesium salts from precipitating. When calcium and magnesium salts precipitate, the crystals may attach to the surface being cleaned and cause undesirable effects in a variety of cleaning systems. For example, calcium carbonate precipitation on the surface of ware can negatively impact the aesthetic appearance of the ware, giving an unclean look. In a region with high levels of metal ions in water, staining can be a significant issue.

It is known to use acidic compositions to clean hard surfaces and that such formulations show good overall cleaning performance and good limescale removal and prevention. However, there are limitations to the convenience of acidic compositions employed as surface cleaners. It is known that some hard surfaces, such as enamel and several metals, e.g. aluminum, are sensitive to acids and may be severely damaged by acidic compositions used to clean said surfaces.

Typical delimer solutions rely on the addition of strong acids to dissolve the scale deposits accumulated on the inside of the dish machine. However, the low pH associated with the use of strong acid in liquid delimer solutions results in the requirement for PPE in the concentrate or use solution.

Environmentally friendly delimer compositions still have to be effective and capable of removing difficult soils, especially those found in institutional settings such as restaurants.

BRIEF SUMMARY OF THE INVENTION

The disclosure includes deliming compositions in which acids may be used at a relatively neutral pH, of from about 2 to 7, to improve the cleaning performance and scale control and further which may be used without the need for personal protective equipment of transportation restrictions. These improvements in cleaning and lime removal are particularly useful in non-phosphorus systems and do not require the use of builders or chelating agents. Traditional delimers involve very strong acids at low pH.

Accordingly, in some aspects the present disclosure relates to general purpose delimer compositions using traditional acids. Preferred acids include urea sulfate, urea hydrochloride, sulfamic acid, methanesulfonic acid, phosphoric acid, citric acid, and combinations thereof. In some respects, the acid is a non-phosphorous acid. In some respects, the deliming composition is phosphorous-free.

Typical deliming compositions disclosed herein include from about 10 to about 35 wt. % of acid; from about 0.1 wt % to about 20 wt. % of surfactant; a pH modifier in an amount so that free citric acid is less than 10%, and from about 35 wt. % to about 65 wt. % of water. The composition may also include preservatives, crystal modifiers, dispersants and the like. In some respects, the composition is free of a chelating agent such as GLDA, MGDA, and glutamic acid. The compositions have less than 10% free acid and do not fall under the transportation regulations.

In some aspects, the method of cleaning and deliming any metal heat exchange system subject to hard water and scale deposits such as ware wash machines, boilers, bathroom fixtures, steamers, laundry machines, a dish machine uses the steps of supplying the delimer composition, inserting the composition into a dispenser in a dish machine, forming a wash solution with the composition and water, so that carbonate and other hard water buildup is removed, and rinsing the machine.

In some aspects, the method of cleaning and deliming a dish machine uses a delimer composition where the composition is dispensed through a rinse arm, followed by a rinse aid step, where the rinse aid is also dispensed through the rinse arm. In this method, some of the acid from the delimer composition remains in the rinse arm and is dispensed simultaneously with the rinse aid in a manner that lowers the pH of the rinse aid.

In some aspects, the method of cleaning and deliming a dish machine uses a single deliming composition for multiple steps, such as both delimer composition and an acidic rinse aid composition.

These and other embodiments will be apparent to those of skill in the art and others in view of the following detailed description of some embodiments. It should be understood, however, that this summary, and the detailed description illustrate only some examples of various embodiments and are not intended to be limiting to the claimed disclosure.

DETAILED DESCRIPTION OF THE INVENTION

Figure 1:
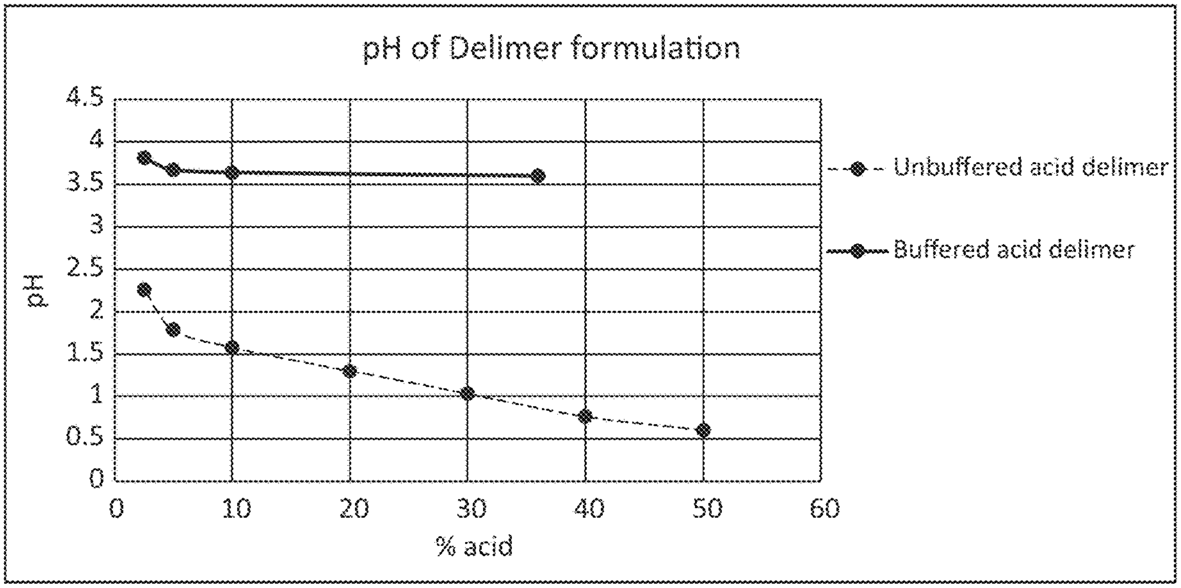
FIG. 1 is a graph of the pH of solutions of buffered or unbuffered acid that could be used as a liquid delimer. In the case of the unbuffered acid formula the pH drops below the corrosive threshold for PPE free. Whereas the buffered acid formula maintains a pH higher than the threshold limit, even at high concentrations of acid.

The embodiments of this disclosure are not limited to particular compositions and methods of use thereof, which can vary and are understood by skilled artisans. It is further to be understood that all terminology used herein is for the purpose of describing particular embodiments only and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers defining the range and include each integer within the defined range.

So that the present disclosure may be more readily understood, certain terms are first defined. Unless defined otherwise, all technical and scientific terms used herein have the same meaning as commonly understood by one of ordinary skill in the art to which embodiments of the disclosure pertain. Many methods and materials similar, modified, or equivalent to those described herein can be used in the practice of the embodiments of the present disclosure without undue experimentation, the preferred materials and methods are described herein. In describing and claiming the embodiments of the present disclosure, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "cleaning" means to perform or aid in soil removal, bleaching, de-scaling, de-staining, microbial population reduction, rinsing, or combination thereof.

As used herein, the terms "phosphate-free" or "phosphorus-free" refers to a composition, mixture, or ingredients that do not contain phosphates or to which the same have not been added. Should other phosphate containing compounds be present through contamination of a composition, mixture, or ingredients, the amount of the same shall be less than 0.5 wt. %. In a preferred embodiment, the amount of the same is less than 0.1 wt. %, and in more preferred embodiment, the amount is less than 0.01 wt. %.

As used herein, the term "substantially free" refers to compositions completely lacking the component or having such a small amount of the component that the component does not affect the performance of the composition. The component may be present as an impurity or as a contaminant and shall be less than 0.5 wt. %. In another embodiment, the amount of the component is less than 0.1 wt. % and in yet another embodiment, the amount of component is less than 0.01 wt. %.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both.

As used herein, the term "ware" includes items such as for example eating and cooking utensils. As used herein, the term "warewashing" refers to washing, cleaning and/or rinsing ware.

The term "weight percent," "wt. %," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt. %," etc.

The methods, systems and compositions of the present disclosure may comprise, consist essentially of, or consist of the component and ingredients of the present disclosure as well as other ingredients described herein. As used herein, "consisting essentially of" means that the methods, systems and compositions may include additional steps, components or ingredients, but only if the additional steps, components or ingredients do not materially alter the basic and novel characteristics of the claimed methods, systems and compositions.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

Acid Deliming Compositions

The disclosure generally relates to methods and compositions for cleaning and deliming a dish machine using acid-based compositions at modest pH values. In some embodiments, the deliming composition includes one or more acids. Preferred acids include organic or inorganic acids and mixtures thereof. In some embodiments, the deliming composition is phosphorous-free or phosphate-free. In some embodiments, the composition can consist of or consist essentially of only the acid or the acid pH modifier and water. Exemplary compositions are shown in Table 1.

TABLE 1

| | | | |
|---|---|---|---|
| Acid | 10-35 wt. % | 15-30 wt. % | 20-25 wt. % |
| Surfactant | 0.01-20 wt. % | 0.05-15 wt. % | 0.1-10 wt. % |
| pH modifier | 0.01-20 wt. % | 0.5-15 wt. % | 1-10 wt. % |
| preservative | 0.01-15 wt. % | 0.05-10 wt. % | 0.1-5 wt. % |
| Water | Balance | Balance | Balance |
| | 35-65 wt. % | 40-60 wt. % | 45-55 wt. % |

Acid Source

The compositions of the present disclosure include an acid source. While the acid may be selected from a wide variety of acids, preferred acids include citric and other organic acids. Examples of suitable acids for use as the acid source according to the disclosure may include inorganic and organic acids. Exemplary inorganic acids include phosphoric, phosphonic, sulfuric, sulfamic, methylsulfamic, hydrochloric, hydrobromic, hydrofluoric, and nitric. Exemplary organic acids include hydroxyacetic (glycolic), citric, lactic, formic, acetic, propionic, butyric, valeric, caproic, gluconic, itaconic, trichloroacetic, urea hydrochloride, and benzoic. Organic dicarboxylic acids can also be used such as oxalic, maleic, fumaric, adipic, and terephthalic acid. Peracids such as peroxyacetic acid and peroxyoctanoic acid may also be used. Any combination of these acids may also be used. Additional acids are particularly well suited for use in the acid compositions of the disclosure, including for example, urea hydrochloride, phosphoric acid, gluconic acid, urea sulfate, sulfamic acid, methane sulfonic acid and others and mixtures thereof. In an embodiment of the disclosure the acid source is selected from the group consisting of urea sulfate, citric acid and combinations thereof. In an embodiment the acid source is phosphate free (e.g. does not include phosphoric acid).

In one embodiment, the acid source preferably comprises from about 10 wt. % to about 35 wt. % of the total composition, from about 15 wt. % to about 30 wt. %, more preferably from about 20 wt. % to about 25 wt. % of the total liquid composition.

Surfactant

The composition can include a surfactant. The surfactant or surfactant mixture can be selected from water soluble or water dispersible nonionic, semi-polar nonionic, anionic, cationic, amphoteric, or zwitterionic surface-active agents; or any combination thereof. Nonionic surfactants are typically preferred. A listing of the classes and species of useful surfactants appears in U.S. Pat. No. 3,664,961 issued May 23, 1972, which is incorporated herein by reference in its entirety.

In one embodiment, the surfactant preferably comprises from about 0.01 wt. % to about 20 wt. % of the total composition, from about 0.05 wt. % to about 15 wt. % of the total composition, and most preferably in the range of from about 0.1 wt. % to about 10 wt. % of the total composition.

Nonionic Surfactants

Nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water-soluble compound having the desired degree of balance between hydrophilic and hydrophobic properties.

Useful nonionic surfactants include:

1. Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade names Pluronic® and Tetronico manufactured by BASF Corp.

Pluronic® compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from 1,000 to 4,000. Ethylene oxide is then added to sandwich this hydrophobe between hydrophilic groups, controlled by length to constitute from about 10% by weight to about 80% by weight of the final molecule.

Tetronic® compounds are tetra-functional block copolymers derived from the sequential addition of propylene oxide and ethylene oxide to ethylenediamine. The molecular weight of the propylene oxide hydrotype ranges from 500 to 7,000; and, the hydrophile, ethylene oxide, is added to constitute from 10% by weight to 80% by weight of the molecule.

2. Condensation products of one mole of alkyl phenol wherein the alkyl chain, of straight chain or branched chain configuration, or of single or dual alkyl constituent, contains from 8 to 18 carbon atoms with from 3 to 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Union Carbide.

3. Condensation products of one mole of a saturated or unsaturated, straight or branched chain alcohol having from 6 to 24 carbon atoms with from 3 to 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Neodol® manufactured by Shell Chemical Co. and Alfonic® manufactured by Vista Chemical Co.

4. Condensation products of one mole of saturated or unsaturated, straight or branched chain carboxylic acid having from 8 to 18 carbon atoms with from 6 to 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Nopalcol® manufactured by Henkel Corporation and Lipopeg® manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols can be used. All of these ester moieties have one or more reactive hydrogen sites on their molecule which can undergo further acylation or ethylene oxide (alkoxide) addition to control the hydrophilicity of these substances. Care must be exercised when adding these fatty esters or acylated carbohydrates to compositions containing amylase and/or lipase enzymes because of potential incompatibility.

Examples of nonionic low foaming surfactants include:

5. Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from 1,000 to 3,100 with the central hydrophile including 10% by weight to 80% by weight of the final molecule. These reverse Pluronics® are manufactured by BASF Corporation under the trade name Pluronic® R surfactants.

Likewise, the Tetronic® R surfactants are produced by BASF Corporation by the sequential addition of ethylene oxide and propylene oxide to ethylenediamine. The hydrophobic portion of the molecule weighs from 2,100 to 6,700 with the central hydrophile including 10% by weight to 80% by weight of the final molecule.

6. Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionics include:

7. The alkylphenoxypolyethoxyalkanols of U.S. Pat. No. 2,903,486 issued Sep. 8, 1959 to Brown et al. and represented by the formula

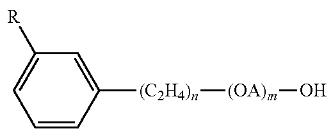

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkaline oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n(C_2H_4O)_m$ H wherein Y is the residue of organic compound having from 1 to 6 carbon atoms and one reactive hydrogen atom, n has an average value of at least 6.4, as determined by hydroxyl number and m has a value such that the oxyethylene portion constitutes 10% to 90% by weight of the molecule.

The conjugated polyoxyalkylene compounds described in U.S. Pat. No. 2,674,619, issued Apr. 6, 1954 to Lundsted et al. having the formula $Y[(C_3H_6O_n(C_2H_4O)_mH]_x$ wherein Y is the residue of an organic compound having from 2 to 6 carbon atoms and containing x reactive hydrogen atoms in which x has a value of at least 2, n has a value such that the molecular weight of the polyoxypropylene hydrophobic base is at least 900 and m has value such that the oxyethylene content of the molecule is from 10% to 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional useful conjugated polyoxyalkylene surface-active agents correspond to the formula: $P[(C_3H_6O)_n(C_2H_4O)_mH]_x$ wherein P is the residue of an organic compound having from 8 to 18 carbon atoms and containing x reactive hydrogen atoms in which x has a value of 1 or 2, n has a value such that the molecular weight of the polyoxyethylene portion is at least 44 and m has a value such that the oxypropylene content of the molecule is from 10% to 90% by weight. In either case the oxypropylene chains may contain optionally, but advantageously, small amounts of ethylene oxide and the oxyethylene chains may contain also optionally, but advantageously, small amounts of propylene oxide.

8. Polyhydroxy fatty acid amide surfactants suitable for use in the present compositions include those having the structural formula $R^2CONR^1Z$ in which: $R^1$ is H, $C_1$-$C_4$ hydrocarbyl, 2-hydroxy ethyl, 2-hydroxy propyl, ethoxy, propoxy group, or a mixture thereof; R is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

9. The alkyl ethoxylate condensation products of aliphatic alcohols with from 0 to 25 moles of ethylene oxide are suitable for use in the present compositions. The alkyl chain of the aliphatic alcohol can either be straight or branched, primary or secondary, and generally contains from 6 to 22 carbon atoms.

10. The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_{10}$-$C_{18}$ ethoxylated fatty alcohols with a degree of ethoxylation of from 3 to 50.

11. Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from 6 to 30 carbon atoms and a polysaccharide, e.g., a polyglycoside, hydrophilic group containing from 1.3 to 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

12. Fatty acid amide surfactants include those having the formula: $R^6CON(R^7)_2$ in which $R^6$ is an alkyl group containing from 7 to 21 carbon atoms and each $R^7$ is independently hydrogen, $C_1$-$C_4$ alkyl, $C_1$-$C_4$ hydroxyalkyl, or —$(C_2H_4O)_xH$, where x is in the range of from 1 to 3.

13. A useful class of non-ionic surfactants includes the class defined as alkoxylated amines or, most particularly, alcohol alkoxylated/aminated/alkoxylated surfactants. These non-ionic surfactants may be at least in part represented by the general formulae:

$R^{20}$—$(PO)_sN$-$(EO)_tH$, $R_2O$—$(PO)_sN$-$(EO)_tH(EO)_tH$, and $R^{20}$—$N(EO)_tH$;

in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula:

$R^{20}$—$(PO)_v$—$N[(EO)_wH][(EO)_zH]$ in which $R^{20}$ is as defined above, v is 1 to 20 (e.g., 1, 2, 3, or 4 (preferably 2)), and w and z are independently 1-10, preferably 2-5.

These compounds are represented commercially by a line of products sold by Huntsman Chemicals as nonionic surfactants. A preferred chemical of this class includes Surfonic™ PEA 25 Amine Alkoxylate.

The treatise Nonionic Surfactants, edited by Schick, M. J., Vol. 1 of the Surfactant Science Series, Marcel Dekker, Inc., New York, 1983 is a reference on the wide variety of nonionic compounds. A typical listing of nonionic classes, and species of these surfactants, is given in U.S. Pat. No. 3,929,678. Further examples are given in "Surface Active Agents and Detergents" (Vol. I and II by Schwartz, Perry and Berch). Each of these references is herein incorporated by reference in their entirety.

Preferred nonionic surfactants include D 097 (PEG-PPG), LD 097 (Polyoxyethylene polyoxypropylene), Pluronic 25-R8 (Polyoxypropylene polyoxyethylene block), Pluronic 10R5, Neodol 45-13 (Linear C14-15 alcohol 13 mole ethoxylate), Neodol 25-12 (Linear alcohol 12 mole ethoxylate), ABIL B 9950 (Tegopren-dimethicone propyl PG), Pluronic N-3 (Propoxy-Ethoxy N-3), Novel II 1012 GB-21 (alcohol ethoxylate C10-12, 21EO), Pluronic 10R5, Pluronic 25-R2 (Polyoxypropylene polyoxyethylene block), Plurafac LF-221 (Alkoxylated Alcohol), Genapol EP-2454 (Fatty alcohol alkoxylate), Plurafac LF-500 (Alcohol ethoxylate propoxylate), and Dehypon LS-36 (Ethoxylated Propoxylated Aliphatic Alcohol).

Semi-Polar Nonionic Surfactants

The semi-polar type of nonionic surface-active agents is another class of useful nonionic surfactants. The semi-polar nonionic surfactants include the amine oxides, phosphine oxides, sulfoxides and their alkoxylated derivatives.

14. Amine oxides are tertiary amine oxides corresponding to the general formula:

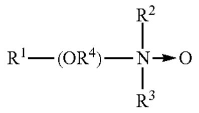

wherein the arrow is a conventional representation of a semi-polar bond; and $R^1$, $R^2$, and $R^3$ may be aliphatic, aromatic, heterocyclic, alicyclic, or combinations thereof.

Generally, for amine oxides of detergent interest, $R^1$ is an alkyl radical of from 8 to 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkaline or a hydroxyalkylene group containing 2 to 3 carbon atoms; and n ranges from 0 to 20.

Useful water soluble amine oxide surfactants are selected from the coconut or tallow alkyl di-(lower alkyl) amine oxides, specific examples of which are dodecyldimethylamine oxide, tridecyldimethylamine oxide, tetradecyldimethylamine oxide, pentadecyldimethylamine oxide, hexadecyldimethylamine oxide, heptadecyldimethylamine oxide, octadecyldimethylamine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Useful semi-polar nonionic surfactants also include the water-soluble phosphine oxides having the following structure:

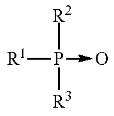

wherein the arrow is a conventional representation of a semi-polar bond; and $R^1$ is an alkyl, alkenyl or hydroxyalkyl moiety ranging from 10 to 24 carbon atoms in chain length; and $R^2$ and $R^3$ are each alkyl moieties separately selected from alkyl or hydroxyalkyl groups containing 1 to 3 carbon atoms.

Examples of phosphine oxides include dimethyldecylphosphine oxide, dimethyltetradecylphosphine oxide, methylethyltetradecylphosphine oxide, dimethylhexadecylphosphine oxide, diethyl-2-hydroxyoctyldecylphosphine oxide, bis(2-hydroxyethyl) dodecylphosphine oxide, and bis(hydroxymethyl)tetradecylphosphine oxide.

Semi-polar nonionic surfactants also include the water-soluble sulfoxide compounds which have the structure:

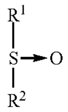

wherein the arrow is a conventional representation of a semi-polar bond; and, $R^1$ is an alkyl or hydroxyalkyl moiety of 8 to 28 carbon atoms, from 0 to 5 ether linkages and from 0 to 2 hydroxyl substituents; and $R^2$ is an alkyl moiety consisting of alkyl and hydroxyalkyl groups having 1 to 3 carbon atoms.

Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

Anionic Surfactants

Anionic surfactants are categorized as anionics because the charge on the hydrophobe is negative; or surfactants in which the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility.

As those skilled in the art understand, anionics are excellent detersive surfactants and are therefore favored additions to heavy duty delimer compositions. Anionic surface-active compounds are useful to impart special chemical or physical properties other than detergency within the composition. Anionics can be employed as gelling agents or as part of a gelling or thickening system. Anionics are excellent solubilizers and can be used for hydrotropic effect and cloud point control.

The majority of large volume commercial anionic surfactants can be subdivided into five major chemical classes and additional sub-groups known to those of skill in the art and described in "Surfactant Encyclopedia," Cosmetics & Toiletries, Vol. 104 (2) 71-86 (1989). The first class includes acylamino acids (and salts), such as acylgluamates, acyl peptides, sarcosinates (e.g. N-acyl sarcosinates), taurates (e.g. N-acyl taurates and fatty acid amides of methyl tauride), and the like. The second class includes carboxylic acids (and salts), such as alkanoic acids (and alkanoates), ester carboxylic acids (e.g. alkyl succinates), ether carboxylic acids, and the like. The third class includes phosphoric acid esters and their salts. The fourth class includes sulfonic acids (and salts), such as isethionates (e.g. acyl isethionates), alkylaryl sulfonates, alkyl sulfonates, sulfosuccinates (e.g. monoesters and diesters of sulfosuccinate), and the like. The fifth class includes sulfuric acid esters (and salts), such as alkyl ether sulfates, alkyl sulfates, and the like.

Anionic sulfate surfactants include the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl)glucamine sulfates, and sulfates of alkylpolysaccharides such as the sulfates of alkylpolyglucoside (the nonionic nonsulfated compounds being described herein).

Examples of suitable synthetic, water soluble anionic detergent compounds include the ammonium and substituted ammonium (such as mono-, di- and triethanolamine) and alkali metal (such as sodium, lithium and potassium) salts of the alkyl mononuclear aromatic sulfonates such as the alkyl benzene sulfonates containing from 5 to 18 carbon atoms in the alkyl group in a straight or branched chain, e.g., the salts of alkyl benzene sulfonates or of alkyl toluene, xylene, cumene and phenol sulfonates; alkyl naphthalene sulfonate, diamyl naphthalene sulfonate, and dinonyl naphthalene sulfonate and alkoxylated derivatives.

Anionic carboxylate surfactants include the alkyl ethoxy carboxylates, the alkyl polyethoxy polycarboxylate surfactants and the soaps (e.g. alkyl carboxyls). Secondary soap surfactants (e.g. alkyl carboxyl surfactants) include those which contain a carboxyl unit connected to a secondary carbon. The secondary carbon can be in a ring structure, e.g. as in p-octyl benzoic acid, or as in alkyl-substituted cyclohexyl carboxylates. The secondary soap surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present.

Other anionic surfactants include olefin sulfonates, such as long chain alkene sulfonates, long chain hydroxyalkane sulfonates or mixtures of alkenesulfonates and hydroxyalkane-sulfonates. Also included are the alkyl sulfates, alkyl poly(ethyleneoxy)ether sulfates and aromatic poly(ethyleneoxy)sulfates such as the sulfates or condensation products of ethylene oxide and nonyl phenol (usually having 1 to 6 oxyethylene groups per molecule). Resin acids and hydrogenated resin acids are also suitable, such as rosin, hydrogenated rosin, and resin acids and hydrogenated resin acids present in or derived from tallow oil.

The particular salts will be suitably selected depending upon the particular formulation and the needs therein.

Further examples of suitable anionic surfactants are given in “Surface Active Agents and Detergents” (Vol. I and II by Schwartz, Perry and Berch), which is herein incorporated by reference in its entirety. A variety of such surfactants are also generally disclosed in U.S. Pat. No. 3,929,678 at Column 23, line 58 through Column 29, line 23.

Cationic Surfactants

Surface active substances are classified as cationic if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an “onium” structure $R_nX^+Y^-$— and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced, or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

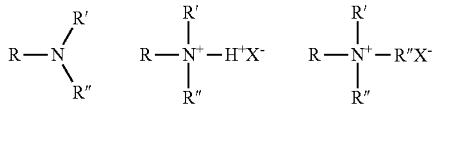

in which, R represents a long alkyl chain, R', R", and R"' may be either long alkyl chains or smaller alkyl or aryl groups or hydrogen and X represents an anion. The amine salts and quaternary ammonium compounds are preferred for their high degree of water solubility.

The majority of large volume commercial cationic surfactants can be subdivided into four major classes and additional sub-groups known to those of skill in the art and described in “Surfactant Encyclopedia,” Cosmetics & Toiletries, Vol. 104 (2) 86-96 (1989), which is herein incorporated by reference in its entirety. The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Useful cationic surfactants include those having the formula $R^1_mR^2_xYLZ$ wherein each $R^1$ is an organic group containing a straight or branched alkyl or alkenyl group optionally substituted with up to three phenyl or hydroxy groups and optionally interrupted by up to four of the following structures:

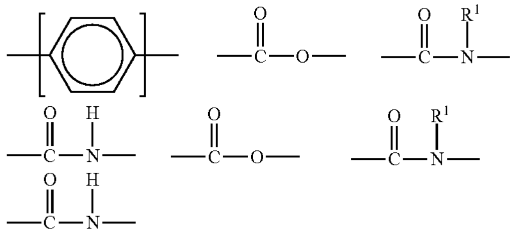

or an isomer or mixture of these structures, and which contains from 8 to 22 carbon atoms. The $R^1$ groups can additionally contain up to 12 ethoxy groups and m is a number from 1 to 3. Preferably, no more than one $R^1$ group in a molecule has 16 or more carbon atoms when m is 2, or more than 12 carbon atoms when m is 3. Each R2 is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group is filled by hydrogens.

Y can be a group including, but not limited to:

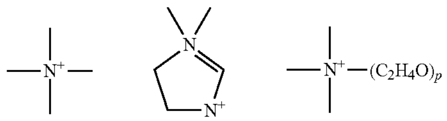

p = about 1 to 12

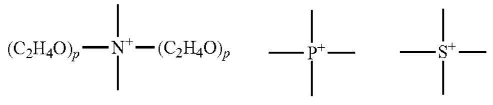

p = about 1 to 12

-continued

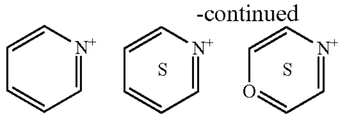

or a mixture thereof.

Preferably, L is 1 or 2, with the Y groups being separated by a moiety selected from $R^1$ and $R^2$ analogs (preferably alkylene or alkenylene) having from 1 to 22 carbon atoms and two free carbon single bonds when L is 2. Z is a water-soluble anion, such as sulfate, methylsulfate, hydroxide, or nitrate anion, particularly preferred being sulfate or methyl sulfate anions, in a number to give electrical neutrality of the cationic component.

Amphoteric Surfactants

Amphoteric, or ampholytic, surfactants contain both a basic and an acidic hydrophilic group and an organic hydrophobic group. These ionic entities may be any of the anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia," Cosmetics & Toiletries, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with ethyl acetate. During alkylation, one or two carboxy-alkyl groups react to form a tertiary amine and an ether linkage with differing alkylating agents yielding different tertiary amines.

Long chain imidazole derivatives generally have the general formula:

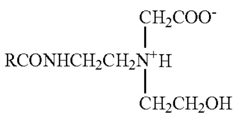

(MONO)ACETATE

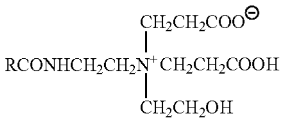

(DI)PROPIONATE

Neutral pH Zwitterion

-continued

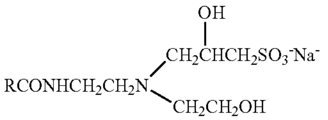

AMPHOTERIC SULFONATE wherein R is an acyclic hydrophobic group containing from 8 to 18 carbon atoms and M is a cation to neutralize the charge of the anion, generally sodium. Commercially prominent imidazoline-derived amphoterics include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Preferred amphocarboxylic acids are produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reacting $RNH_2$, in which R is a $C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes include alkyl beta-amino dipropionates, $RN(C_2H_4COOM)_2$ and $RNHC_2H_4COOM$. In these, R is preferably an acyclic hydrophobic group containing from 8 to 18 carbon atoms, and M is a cation to neutralize the charge of the anion.

Preferred amphoteric surfactants include those derived from coconut products such as coconut oil or coconut fatty acid. The more preferred of these coconut derived surfactants include as part of their structure an ethylenediamine moiety, an alkanolamide moiety, an amino acid moiety, preferably glycine, or a combination thereof; and an aliphatic substituent of from 8 to 18 (preferably 12) carbon atoms. Such a surfactant can also be considered an alkyl amphodicarboxylic acid. Disodium cocoampho dipropionate is one most preferred amphoteric surfactant and is commercially available under the tradename Miranol™ FBS from Rhodia Inc., Cranbury, N.J. Another most preferred coconut derived amphoteric surfactant with the chemical name disodium cocoampho diacetate is sold under the tradename Miranol™ C2M-SF Conc., also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch), which is herein incorporated by reference in its entirety.

Zwitterionic Surfactants

Zwitterionic surfactants can be thought of as a subset of the amphoteric surfactants. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion, a negative charged carboxyl group, and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate. Betaine and sultaine surfactants are exemplary zwitterionic surfactants for use herein.

A general formula for these compounds is:

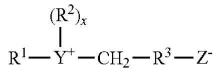

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane 1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S [N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

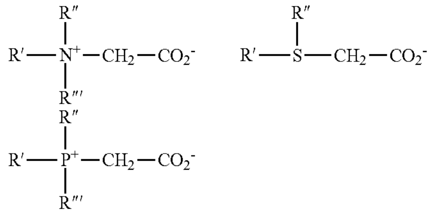

These surfactant betaines typically do not exhibit strong cationic or anionic characters at pH extremes, nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines include those compounds having the formula $(R(R^1)_2N^+R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch), which is herein incorporated by reference in its entirety.

Chelating Agents

The delimer composition can optionally include a chelating agent. Surprisingly, it has been found that using selected chelating agents is beneficial in combination with the delimer composition of the disclosure, particularly in a warewashing system that uses chemistry with alternating pH ranges. As certain soils are attacked by high pH compositions, over time, in an alternating pH system, the pH of the bulk wash tank gradually decreases making the wash solution in the wash tank less alkaline and therefore less effective at removing soils. In some embodiments, the present disclosure relates to using selected chelating agents to offset the gradual decrease in pH and boost cleaning performance. The result is that the cleaning benefits of an alternating pH system can be achieved without sacrificing cleaning performance over time. In addition to improving overall cleaning performance, including the chelating agent also improves specific soil removal efficacy, such as for example coffee and tea stain removal.

In one embodiment, the chelating agent preferably comprises from about 1 wt. % to about 50 wt. % of the total composition, from about 4 wt. % to about 30 wt. % of the total composition, and most preferably in the range of from about 10 wt. % to about 20 wt. % of the total composition.

In an embodiment, preferred chelating agents include citric acid, GLDA, MGDA, and glutamic acid. But other chelating agents can be used as well, including phosphates, phosphonates, and amino-acetates. In an optional embodiment no phosphates or phosphonates are used for the chelating agent.

Exemplary phosphates include sodium orthophosphate, potassium orthophosphate, sodium pyrophosphate, potassium pyrophosphate, sodium tripolyphosphate (STPP), and sodium hexametaphosphate. Exemplary phosphonates include 1-hydroxyethane-1,1-diphosphonic acid, aminotrimethylene phosphonic acid, diethylenetriaminepenta(methylenephosphonic acid), I-hydroxyethane-1,1-diphosphonic acid $CH._3C(OH)[PO(OH)_2]_2$, aminotri(methylenephosphonic acid) $N[CH_2PO(OH)_2]_3$, aminotri(methylenephosphonate), sodium salt 2-hydroxyethyliminobis(methylenephosphonic acid) $HOCH_2CH_2N[CH_2PO(OH)_2]_2$, diethylenetriaminepenta(-methylenephosphonic acid) $(HO)_2POCH_2N[CH_2CH_2N[CH_2PO(OH)_2]_2]_2$, diethylenetriaminepenta(methylenephosphonate), sodium salt $C_9H(_{28}$-x)$N_3Na_xO_{15}P_5$ (x=7), hexamethylenediamine(tetramethylenephosphonate), potassium salt $C_{10}H_{(28}-x)N_2K_xO_{12}P_4$ (x=6), bis(hexamethylene) triamine(pentamethylenephosphonic acid) $(HO_2)POCH_2N[(CH_2)_6N[CH_2PO(OH)_2]_2]_2$, and phosphorus acid $H_3PO_3$.

Exemplary amino-acetates include aminocarboxylic acids such as N-hydroxyethyliminodiacetic acid, nitrilotriacetic acid (NTA), ethylenediaminetetraacetic acid (EDTA), N-hydroxyethyl-ethylenediaminetriacetic acid (HEDTA), and diethylenetriaminepentaacetic acid (DTPA).

pH Modifier

The composition includes one or more pH modifiers to adjust the level of free acid in the composition. Examples of pH modifiers include bases, such as alkali metal hydroxides. The composition may comprise a pH modifier about 0.01 wt. % to about 20 wt. %, about 0.5 wt. % to about 15 wt. % or about 1 wt. % to about 10 wt. %

Preservative

The delimer composition can also include an effective amount of a preservative. Often, overall acidity and/or acids in the delimer composition can provide a preservative and stabilizing function. Some embodiments of the inventive delimer composition also include a GRAS preservative system. Preferred preservatives for use in the delimer compositions include, sodium pyrithione, methylchloroisothiazolinone, methylisothiazolinone, or a blend of the same. A blend of methylchloroisothiazolinone and methylisothiazolinone is available from Dow Chemical under the trade name KATHON™ CG.

When a preservative is included in the delimer compositions, it can be present from about 0.01 wt. % to about 15 wt. %; preferably from about 0.05 wt. % to about 10 wt. %; more preferably from about 0.1 wt. % to about 5 wt %.

Threshold Inhibitor/Crystal Modifier Component

The composition may also include a threshold agent of crystal modifier for reducing precipitation of calcium carbonate in the use solution. In general, it is expected that the threshold inhibitor/crystal modifier component will loosely hold calcium to reduce precipitation of calcium carbonate once it is subjected to a pH of at least 8.0.

Exemplary threshold inhibitor/crystal modifier components include phosphonocarboxylic acids, phosphonates, polymers, and mixtures thereof. Exemplary phosphonocarboxylic acids include those available under the name Bayhibit™ AM from Bayer, and include 2-phosphonobutane-1,2,4, tricarboxylic acid (PBTC). Exemplary phosphonates include amino tri(methylene phosphonic acid), 1-hydroxy ethylidene 1-1-diphosphonic acid, ethylene diamine tetra (methylene phosphonic acid), hexamethylene diamine tetra (methylene phosphonic acid), diethylene triamine penta (methylene phosphonic acid), and mixtures thereof. Exemplary phosphonates are available under the name Dequest™ from Monsanto. Exemplary polymers include polyacrylates, polymethacrylates, polyacrylic acid, polyitaconic acid, polymaleic acid, sulfonated polymers, copolymers and mixtures thereof. It should be understood that the mixtures can include mixtures of different acid substituted polymers within the same general class. In addition, it should be understood that salts of acid substituted polymers can be used. The useful carboxylated polymers may be generically categorized as water-soluble carboxylic acid polymers such as polyacrylic and polymethacrylic acids or vinyl addition polymers, in addition to the acid-substituted polymers used in the present disclosure. Of the vinyl addition polymers contemplated, maleic anhydride copolymers as with vinyl acetate, styrene, ethylene, isobutylene, acrylic acid and vinyl ethers are examples. The polymers tend to be water-soluble or at least colloidally dispersible in water. The molecular weight of these polymers may vary over a broad range although it is preferred to use polymers having average molecular weights ranging between 1,000 up to 1,000,000. These polymers have a molecular weight of 100,000 or less and between 1,000 and 10,000.

The polymers or copolymers (either the acid-substituted polymers or other added polymers) may be prepared by either addition or hydrolytic techniques. Thus, maleic anhydride copolymers are prepared by the addition polymerization of maleic anhydride and another comonomer such as styrene. The low molecular weight acrylic acid polymers may be prepared by addition polymerization of acrylic acid or its salts either with itself or other vinyl comonomers. Alternatively, such polymers may be prepared by the alkaline hydrolysis of low molecular weight acrylonitrile homopolymers or copolymers. For such a preparative technique see Newman U.S. Pat. No. 3,419,502.

The threshold inhibitor/crystal modifier component should be provided in an amount sufficient so that when it is in the use solution, it sufficiently prevents the precipitation of calcium carbonate, and other insoluble salts such as magnesium silicate, magnesium hydroxide and the like or disrupts crystal growth. The threshold inhibitor/crystal modifier component can be provided in an amount of between about 0.001 wt. % and about 12 wt. % based on the weight of the composition, more preferably 0.005 wt. % and 10 wt. % and most preferably between about between about 0.01 and 8 wt. % of the composition.

Builders

The compositions are preferably free of builders such as alkali metal hydroxides, alkali metal salts, silicates, phosphates, amines, and mixtures thereof. Exemplary alkali metal hydroxides include sodium hydroxide, potassium hydroxide, and lithium hydroxide (other than a pH modifier used only in an amount to reduce free citric acid typically less than 15%. When present as a builder component builder range up to 90% of a cleaning solution typically 45 wt. %, 50 wt. % and 70 wt. % solution.

Exemplary alkali metal salts include sodium carbonate, trisodium phosphate, potassium carbonate, and mixtures thereof. Exemplary silicates include sodium metasilicates, sesquisilicates, orthosilicates, potassium silicates, and mixtures thereof. Exemplary phosphates include sodium pyrophosphate, potassium pyrophosphate, and mixtures thereof. Exemplary amines include alkanolamine. Exemplary alkanolamines include triethanolamine, monoethanolamine, diethanolamine, and mixtures thereof.

Dyes

Various dyes, odorants including perfumes, and other aesthetic enhancing agents may also be included in the delimer. Dyes may be included to alter the appearance of the composition, as for example, FD&C Blue 1 (Sigma Chemical), FD&C Yellow 5 (Sigma Chemical), Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keyston Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), and the like.

Additional Functional Ingredients

Other active ingredients may optionally be used to improve the effectiveness of the compositions, including the delimer detergents according to embodiments of the disclosure. Some non-limiting examples of such additional functional ingredients can include anticorrosion agents, enzymes, foam inhibitors, thickeners, antiredeposition agents, anti-etch agents, antimicrobial agents, bleaching agents, catalysts, and other ingredients useful in imparting a desired characteristic or functionality in the composition. The following describes some examples of such ingredients.

In one embodiment, the additional functional ingredient (or combination of additional functional ingredients) preferably comprises from about 0 wt. % to about 60 wt. % of the total composition, from about 0.0001 wt. % to about 60 wt. % of the total composition, from about 0.1 wt. % to about 60 wt. % of the total composition, from about 0.5 wt. % to about 40 wt. % of the total composition, more preferably from about 1 wt. % to about 20 wt. % of the total composition.

Anticorrosion Agents

The composition may optionally include an anticorrosion agent. Anticorrosion agents help to prevent chemical attack, oxidation, discoloration, and pitting on dish machines and dishware surfaces. Preferred anticorrosion agents include copper sulfate, triazoles, triazines, sorbitan esters, gluconate, borates, phosphonates, phosphonic acids, triazoles, organic amines, sorbitan esters, carboxylic acid derivatives, sarcosinates, phosphate esters, zinc, nitrates, chromium, molybdate containing components, and borate containing components. Exemplary phosphates or phosphonic acids are available under the name Dequest (i.e., Dequest 2000, Dequest 2006, Dequest 2010, Dequest 2016, Dequest 2054, Dequest 2060, and Dequest 2066) from Solutia, Inc. of St. Louis, Mo. Exemplary triazoles are available under the name Cobratec (i.e., Cobratec 100, Cobratec TT-50-S, and Cobratec 99) from PMC Specialties Group, Inc. of Cincinnati, Ohio. Exemplary organic amines include aliphatic amines, aromatic amines, monoamines, diamines, triamines, polyamines, and their salts. Exemplary amines are available under the names Amp (i.e. Amp-95) from Angus Chemical Company of Buffalo Grove, Ill.; WGS (i.e., WGS-50) from Jacam Chemicals, LLC of Sterling, Kans.; Duomeen (i.e., Duomeen O and Duomeen C) from Akzo Nobel Chemicals, Inc. of Chicago, Ill.; DeThox amine (C Series and T Series) from DeForest Enterprises, Inc. of Boca Raton, Fla.; Deriphat series from Henkel Corp. of Ambler, Pa.; and Maxhib (AC Series) from Chemax, Inc. of Greenville, S.C. Exemplary sorbitan esters are available under the name Calgene (LA-series) from Calgene Chemical Inc. of Skokie, Ill. Exemplary carboxylic acid derivatives are available under the name Recor (i.e., Recor 12) from Ciba-Geigy Corp. of Tarrytown, N.Y. Exemplary sarcosinates are available under the names Hamposyl from Hampshire Chemical Corp. of Lexington, Mass.; and Sarkosyl from Ciba-Geigy Corp. of Tarrytown, N.Y.

The composition optionally includes an anticorrosion agent for providing enhanced luster to the metallic portions of a dish machine. When an anticorrosion agent is incorporated into the composition, it is preferably included in an amount of between about 0.05 wt. % and about 5 wt. %, between about 0.5 wt. % and about 4 wt. % and between about 1 wt. % and about 3 wt. %.

Wetting Agents

The compositions may optionally include a wetting agent which can raise the surface activity of the composition. The wetting agent may be selected from the list of surfactants described herein. Preferred wetting agents include Triton CF 100 available from Dow Chemical, Abil 8852 available from Goldschmidt, and SLF-18-45 available from BASF. The wetting agent is preferably present from about 0.1 wt. % to about 10 wt. %, more preferably from about 0.5 wt. % to 5 wt. %, and most preferably from about 1 wt. % to about 2 wt. %.

Enzymes

The composition may optionally include one or more enzymes, which can provide desirable activity for removal of protein-based, carbohydrate-based, or triglyceride-based soils from substrates such as flatware, cups and bowls, and pots and pans. Suitable enzymes can act by degrading or altering one or more types of soil residues encountered on a surface thus removing the soil or making the soil more removable by a surfactant or other component of the cleaning composition. Both degradation and alteration of soil residues can improve detergency by reducing the physicochemical forces which bind the soil to the surface or textile being cleaned, i.e. the soil becomes more water soluble. For example, one or more proteases can cleave complex, macromolecular protein structures present in soil residues into simpler short chain molecules which are, of themselves, more readily desorbed from surfaces, solubilized, or otherwise more easily removed by detersive solutions containing said proteases.

Suitable enzymes include a protease, an amylase, a lipase, a gluconase, a cellulase, a peroxidase, or a mixture thereof of any suitable origin, such as vegetable, animal, bacterial, fungal or yeast origin. Preferred selections are influenced by factors such as pH-activity and/or stability optima, thermostability, and stability to active detergents, builders and the like. In this respect bacterial or fungal enzymes are preferred, such as bacterial amylases and proteases, and fungal cellulases. Preferably the enzyme is a protease, a lipase, an amylase, or a combination thereof.

A valuable reference on enzymes is "Industrial Enzymes," Scott, D., in Kirk-Othmer Encyclopedia of Chemical Technology, 3rd Edition, (editors Grayson, M. and EcKroth, D.) Vol. 9, pp. 173-224, John Wiley & Sons, New York, 1980, which is incorporated herein by reference in its entirety.

Protease

A protease can be derived from a plant, an animal, or a microorganism. Preferably the protease is derived from a microorganism, such as a yeast, a mold, or a bacterium. Preferred proteases include serine proteases active at alkaline pH, preferably derived from a strain of *Bacillus* such as *Bacillus subtilis* or *Bacillus licheniformis*; these preferred proteases include native and recombinant subtilisins. The protease can be purified or a component of a microbial extract, and either wild type or variant (either chemical or recombinant). Examples of proteolytic enzymes include (with trade names) Savinase®; a protease derived from *Bacillus lentus* type, such as Maxacal®, Opticlean®, Durazym®, and Properase®; a protease derived from *Bacillus licheniformis*, such as Alcalase® and Maxatase®; and a protease derived from *Bacillus amyloliquefaciens*, such as Primase®. Preferred commercially available protease enzymes include those sold under the trade names Alcalase®, Savinase®, Primase®, Durazym®, or Esperase® by Novo Industries A/S (Denmark); those sold under the trade names Maxatase®, Maxacal®, or Maxapem® by Gist-Brocades (Netherlands); those sold under the trade names Purafect®, Purafect OX, and Properase by Genencor International; those sold under the trade names Opticlean®® or Optimase® by Solvay Enzymes; and the like. A mixture of such proteases can also be used. For example, Purafect® is a preferred alkaline protease (a subtilisin) having application in lower temperature cleaning programs, from about 30° C. to about 65° C. whereas, Esperase®® is an alkaline protease of choice for higher temperature detersive solutions, from about 50° C. to about 85° C. Suitable detersive proteases are described in patent publications including: GB 1,243,784, WO 9203529 A (enzyme/inhibitor system), WO 9318140 A, and WO 9425583 (recombinant trypsin-like protease) to Novo; WO 9510591 A, WO 9507791 (a protease having decreased adsorption and increased hydrolysis), WO 95/30010, WO 95/30011, WO 95/29979, to Procter & Gamble; WO 95/10615 (*Bacillus amyloliquefaciens* subtilisin) to Genencor International; EP 130,756 A (protease A); EP 303,761 A (protease B); and EP 130,756 A. A variant protease is preferably at least 80% homologous, preferably having at least 80% sequence identity, with the amino acid sequences of the proteases in these references.

Naturally, mixtures of different proteolytic enzymes may be used. While various specific enzymes have been described above, it is to be understood that any protease which can confer the desired proteolytic activity to the composition may be used. While the actual amounts of protease can be varied to provide the desired activity, the protease is preferably present from about 0.1 wt. % to about 3 wt. % more preferably from about 1 wt. % to about 3 wt. %, and most preferably about 2 wt. % of commercially available enzyme. Typical commercially available enzymes include about 5-10% of active enzyme protease.

Amylase

An amylase can be derived from a plant, an animal, or a microorganism. Preferably the amylase is derived from a microorganism, such as a yeast, a mold, or a bacterium. Preferred amylases include those derived from a *Bacillus*, such as *B. licheniformis, B. amyloliquefaciens, B. subtilis*, or *B. stearothermophilus*. The amylase can be purified or a component of a microbial extract, and either wild type or variant (either chemical or recombinant), preferably a variant that is more stable under washing or presoak conditions than a wild type amylase.

Examples of amylase enzymes that can be employed include those sold under the trade name Rapidase by Gist-Brocades® (Netherlands); those sold under the trade names Termamyl®, Fungamyl® or Duramyl® by Novo; Purastar STL or Purastar OXAM by Genencor; and the like. Preferred commercially available amylase enzymes include the stability enhanced variant amylase sold under the trade name Duramyl® by Novo. A mixture of amylases can also be used.

Suitable amylases include: 1-amylases described in WO 95/26397, PCT/DK96/00056, and GB 1,296,839 to Novo; and stability enhanced amylases described in J. Biol. Chem., 260(11):6518-6521 (1985); WO 9510603 A, WO 9509909 A and WO 9402597 to Novo; references disclosed in WO 9402597; and WO 9418314 to Genencor International. A variant I-amylase is preferably at least 80% homologous, preferably having at least 80% sequence identity, with the amino acid sequences of the proteins of these references. Each of the references cited herein are incorporated by reference in its entirety.

Naturally, mixtures of different amylase enzymes can be used. While various specific enzymes have been described above, it is to be understood that any amylase which can confer the desired amylase activity to the composition can be used. While the actual amount of amylases can be varied to provide the desired activity, the amylase is preferably present from about 0.1 wt. % to about 3 wt. %, more preferably from about 1 wt. % to about 3 wt. %, and most preferably about 2 wt. % of commercially wt. % available enzyme. Typical commercially available enzymes include about 0.25 to about 5% of active amylase.

Cellulases

A suitable cellulase can be derived from a plant, an animal, or a microorganism. Preferably the cellulase is derived from a microorganism, such as a fungus or a bacterium. Preferred cellulases include those derived from a fungus, such as *Humicola insolens, Humicola* strain DSM1800, or a cellulase 212-producing fungus belonging to the genus *Aeromonas* and those extracted from the hepatopancreas of a marine mollusk, *Dolabella Auricula* Solander. The cellulase can be purified or a component of an extract, and either wild type or variant (either chemical or recombinant).

Examples of cellulase enzymes that can be employed include those sold under the trade names Carezyme® or Celluzyme® by Novo, or Cellulase by Genencor, and the like. A mixture of cellulases can also be used. Suitable cellulases are described in patent documents including: U.S. Pat. No. 4,435,307, GB-A-2.075.028, GB-A-2.095.275, DE-OS-2.247.832, WO 9117243, and WO 9414951 A (stabilized cellulases) to Novo, each reference incorporated herein by reference in its entirety.

Naturally, mixtures of different cellulase enzymes can be used. While various specific enzymes have been described above, it is to be understood that any cellulase which can confer the desired cellulase activity to the composition can be used. While the actual amount of cellulose can be varied to provide the desired activity, the cellulose is preferably present from about 0.1 wt. % to about 3 wt. %, more preferably from about 1 wt. % to about 3 wt. %, and most preferably 2 wt. % of commercially available enzyme. Typical commercially available enzymes include about 5-10% active enzyme cellulase.

Lipases

A suitable lipase can be derived from a plant, an animal, or a microorganism. Preferably the lipase is derived from a microorganism, such as a fungus or a bacterium. Preferred lipases include those derived from a *Pseudomonas*, such as *Pseudomonas stutzeri* ATCC 19.154, or from a *Humicola*, such as *Humicola lanuginosa* (typically produced recombinantly in *Aspergillus oryzae*). The lipase can be purified or a component of an extract, and either wild type or variant (either chemical or recombinant).

Examples of lipase enzymes include those sold under the trade names Lipase P "Amano" or "Amano-P" by Amano Pharmaceutical Co. Ltd., Nagoya, Japan or under the trade name Lipolase® by Novo, and the like. Other commercially available lipases include Amano-CES, lipases derived from Chromobacter *viscosum*, e.g. Chromobacter *viscosum* var. lipolyticum NRRLB 3673 from Toyo Jozo Co., Tagata, Japan; Chromobacter *viscosum* lipases from U.S. Biochemical Corp., U.S.A. and Disoynth Co., and lipases derived from *Pseudomonas gladioli* or from *Humicola lanuginosa.*

A preferred lipase is sold under the trade name Lipolase® by Novo. Suitable lipases are described in patent documents, which are herein incorporated by reference in their entirety, including: WO 9414951 A (stabilized lipases) to Novo, WO 9205249, RD 94359044, GB 1,372,034, Japanese Patent Application 53,20487, laid open Feb. 24, 1978 to Amano Pharmaceutical Co. Ltd., and EP 341,947.

Naturally, mixtures of different lipase enzymes can be used. While various specific enzymes have been described above, it is to be understood that any lipase which can confer the desired lipase activity to the composition can be used. While the actual amount of lipase can be varied to provide the desired activity, the lipase is preferably present from about 0.1 wt. % to about 3 wt. % more preferably from about 1 wt. % to about 3 wt. %, and most preferably about 2 wt.

% of commercially available enzyme. Typical commercially available enzymes include about 5-10% active enzyme lipase.

Additional Enzymes

Additional suitable enzymes include a cutinase, a peroxidase, a gluconase, and the like. Suitable cutinase enzymes are described in WO 8809367 A to Genencor. Known peroxidases include horseradish peroxidase, ligninase, and haloperoxidases such as chloro- or bromo-peroxidase. Suitable peroxidases are disclosed in WO 89099813 A and WO 8909813 A to Novo. Peroxidase enzymes can be used in combination with oxygen sources, e.g., percarbonate, perborate, hydrogen peroxide, and the like. Additional enzymes are disclosed in WO 9307263 A and WO 9307260 A to Genencor International, WO 8908694 A to Novo, and U.S. Pat. No. 3,553,139 to McCarty et al., U.S. Pat. No. 4,101,457 to Place et al., U.S. Pat. No. 4,507,219 to Hughes and U.S. Pat. No. 4,261,868 to Hora et al. Each of the references disclosing additional suitable enzymes are herein incorporated by reference in its entirety.

An additional enzyme, such as a cutinase or peroxidase can be derived from a plant, an animal, or a microorganism. Preferably the enzyme is derived from a microorganism. The enzyme can be purified or a component of an extract, and either wild type or variant (either chemical or recombinant).

Naturally, mixtures of different additional enzymes can be incorporated. While various specific enzymes have been described above, it is to be understood that any additional enzyme which can confer the desired enzyme activity to the composition can be used. While the actual amount of additional enzyme, such as cutinase or peroxidase, can be varied to provide the desired activity, the enzyme is preferably from about 1 wt. % to about 3 wt. %, and most preferably about 2 wt. % of commercially available enzyme. Typical commercially available enzymes include about 5-10% h active enzyme.

Foam Inhibitors

A foam inhibitor may be optionally included for reducing the stability of any foam that is formed. Examples of foam inhibitors include silicon compounds such as silica dispersed in polydimethylsiloxane, fatty amides, hydrocarbon waxes, fatty acids, fatty esters, fatty alcohols, fatty acid soaps, ethoxylates, mineral oils, polyethylene glycol esters, polyoxyethylene-polyoxypropylene block copolymers, alkyl phosphate esters such as monostearyl phosphate and the like. A discussion of foam inhibitors may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein in its entirety. The composition may include from about 0.0001 wt. % to about 5 wt. % and more preferably from about 0.01 wt. % to about 3 wt. % of the foam inhibitor.

Thickeners

The composition may optionally include a thickener so that the composition is a viscous liquid, gel, or semisolid. The thickener may be organic or inorganic in nature. Thickeners can be divided into organic and inorganic thickeners. Of the organic thickeners there are (1) cellulosic thickeners and their derivatives, (2) natural gums, (3) acrylates, (4) starches, (5) stearates, and (6) fatty acid alcohols. Of the inorganic thickeners there are (7) clays, and (8) salts.

Some non-limiting examples of cellulosic thickeners include carboxymethyl hydroxyethylcellulose, cellulose, hydroxybutyl methylcellulose, hydroxyethylcellulose, hydroxypropylcellulose, hydroxypropyl methyl cellulose, methylcellulose, microcrystalline cellulose, sodium cellulose sulfate, and the like. Some non-limiting examples of natural gums include acacia, calcium carrageenan, guar, gelatin, guar gum, hydroxypropyl guar, karaya gum, kelp, locust bean gum, pectin, sodium carrageenan, tragacanth gum, xanthan gum, and the like. Some non-limiting examples of acrylates include potassium aluminum polyacrylate, sodium acrylate/vinyl alcohol copolymer, sodium polymethacrylate, and the like. Some non-limiting examples of starches include oat flour, potato starch, wheat flour, wheat starch, and the like. Some non-limiting examples of stearates include methoxy PEG-22/dodecyl glycol copolymer, PEG-2M, PEG-5M, and the like. Some non-limiting examples of fatty acid alcohols include caprylic alcohol, cetearyl alcohol, lauryl alcohol, oleyl alcohol, palm kernel alcohol, and the like. Some non-limiting examples of clays include bentonite, magnesium aluminum silicate, magnesium trisilicate, stearalkonium bentonite, tromethamine magnesium aluminum silicate, and the like. Some non-limiting examples of salts include calcium chloride, sodium chloride, sodium sulfate, ammonium chloride, and the like. Some non-limiting examples of thickeners that thicken the non-aqueous portions include waxes such as candelilla wax, carnauba wax, beeswax, and the like, oils, vegetable oils and animal oils, and the like.

The composition may contain one thickener or a mixture of two or more thickeners. The amount of thickener present in the composition depends on the desired viscosity of the composition. The composition preferably has a viscosity from about 100 to about 15,000 is centipoise, from about 150 to about 10,000 centipoise, and from about 200 to about 5,000 centipoise as determined using a Brookfield DV-II+ rotational viscometer using spindle #21 @ 20 rpm @ 70° F.

Accordingly, to achieve the preferred viscosities, the thickener may be present in the composition in an amount from about 0 wt. % to about 20 wt. % of the total composition, from about 0.1 wt. % to about 10 wt. %, and from about 0.5 wt. % to about 5 wt. % of the total composition.

Antiredeposition Agents

The composition may also optionally include an antiredeposition agent capable of facilitating sustained suspension of soils in a cleaning solution and preventing the removed soils from being re-deposited onto the substrate being cleaned. Examples of suitable antiredeposition agents include fatty acid amides, complex phosphate esters, styrene maleic anhydride copolymers, and cellulosic derivatives such as hydroxyethyl cellulose, hydroxypropyl cellulose, and the like. The composition may include from about 0.5 wt. % to about 10 wt. % and more preferably from about 1 wt. % to about 5 wt. % of an antiredeposition agent.

Antimicrobial Agent

The compositions may optionally include an antimicrobial agent. Antimicrobial agents are chemical compositions that can be used in the composition to prevent microbial contamination and deterioration of commercial products material systems, surfaces, etc. Generally, these materials fall in specific classes including phenolics, halogen compounds, quaternary ammonium compounds, metal derivatives, amines, alkanol amines, nitro derivatives, analides, organosulfur and sulfur-nitrogen compounds and miscellaneous compounds. The given antimicrobial agent, depending on chemical composition and concentration, may simply limit further proliferation of numbers of the microbe or may destroy all or a substantial proportion of the microbial population.

As used herein, the terms "microbes" and "microorganisms" typically refer primarily to bacteria and fungus microorganisms. In use, the antimicrobial agents are formed into the final product that when diluted and dispensed using an aqueous stream forms an aqueous disinfectant or sanitizer composition that can be contacted with a variety of surfaces resulting in prevention of growth or the killing of a substantial proportion of the microbial population.

Common antimicrobial agents that may be used include phenolic antimicrobials such as pentachlorophenol, orthophenylphenol; halogen containing antibacterial agents that may be used include sodium trichloroisocyanurate, sodium dichloroisocyanurate (anhydrous or dihydrate), iodine-poly (vinylpyrolidin-onen) complexes, bromine compounds such as 2-bromo-2-nitropropane-1,3-diol; quaternary antimicrobial agents such as benzalconium chloride, cetylpyridiniumchloride; amines and nitro containing antimicrobial compositions such as hexahydro-1,3,5-tris(2-hydroxyethyl)-s-triazine, dithiocarbamates such as sodium dimethyldithiocarbamate, and a variety of other materials known in the art for their microbial properties. Antimicrobial agents may be encapsulated to improve stability and/or to reduce reactivity with other materials in the delimer composition.

When an antimicrobial agent or preservative is incorporated into the composition, it is preferably included in an amount of between about 0.01 wt. % to about 5 wt. %, between about 0.01 wt. % to about 2 wt. %, and between about 0.1 wt. % to about 1.0 wt. %.

Bleaching Agent

The delimer composition may optionally include a bleaching agent. Bleaching agents include bleaching compounds capable of liberating an active halogen species, such as $Cl_2$, $Br_2$, —OCI— and/or —$OBr^-$, under conditions typically encountered during the cleansing process. Suitable bleaching agents include, for example, chlorine-containing compounds such as a chlorine, a hypochlorite, chloramine. Preferred halogen-releasing compounds include the alkali metal dichloroisocyanurates, chlorinated trisodium phosphate, the alkali metal hypochlorites, monochlorarrine and dichloramine, and the like. Encapsulated bleaching sources may also be used to enhance the stability of the bleaching source in the composition (see, for example, U.S. Pat. Nos. 4,618,914 and 4,830,773, the disclosure of which is incorporated by reference herein). A bleaching agent may also be a peroxygen or active oxygen source such as hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine, and the like.

A cleaning composition may include a minor but effective amount of a bleaching agent, preferably from about 0.1 wt. % to about 10 wt. %, preferably from about lwt. % to about 6 wt. %.

Catalyst

The delimer compositions can optionally include a catalyst capable of reacting with another material in either the delimer composition, or another composition used in the dishwashing machine. For example, in some embodiments, the delimer composition can be used in a method of dishwashing where the method includes an delimer composition and an alkaline composition, and the delimer composition includes a catalyst and the alkaline composition includes something that the catalyst reacts with, such as an oxygen source, such that when the alkaline composition and the delimer composition interact inside of the dishwashing machine, they react. One reaction could be the production of oxygen gas in situ on and in soil located on an article to be cleaned inside of the dishmachine. The opposite could also be true, where the alkaline composition includes a catalyst and the delimer composition includes something that the catalyst reacts with such as a bleaching agent or oxygen source.

Exemplary catalysts include but are not limited to transition metal complexes, halogens, ethanolamines, carbonates and bicarbonates, iodide salts, hypochlorite salts, catalase enzymes, bisulfites, thiosulfate, and UV light. Exemplary transition metal complexes can be compositions that include a transition metal such as tin, lead, manganese, molybdenum, chromium, copper, iron, cobalt, and mixtures thereof. Exemplary halogens include fluorine, chlorine, bromine, and iodine.

Methods of Using the Delimer Compositions

The disclosure also relates to methods of using the delimer compositions. In some embodiments, the method includes dispensing the delimer composition through the rinse arm of the dishmachine and thereafter dispensing a rinse aid through the same rinse arm. In this method, a portion of the delimer composition remains in the rinse arm as residual product. This residual delimer composition is combined with the rinse aid when the rinse aid is dispensed through the same rinse arm. The combination of the rinse aid and the residual delimer composition lowers the pH of the rinse aid and makes it more effective at removing soils on articles in the final rinse.

In an embodiment, the residual delimer composition lowers the pH of the rinse aid composition for a period of time by at least about 0.5 pH units, preferably at least about 1 pH unit, or more preferably at least about 1.5 pH units or more in comparison to the rinse aid composition alone. In an aspect of the disclosure, the residual delimer composition lowers the pH of the rinse aid composition for a brief period of time, such as a second or a few seconds by at least about 0.5 pH units, preferably at least about 1 pH unit, or more preferably at least about 1.5 pH units or more in comparison to the rinse aid composition alone.

Dispensing the delimer composition through the rinse arm and thereafter spraying the final rinse water with the same rinse arm is the preferred way of lowering the pH in the final rinse, but it is understood that the effect can be accomplished in other ways. For example, the delimer composition could be pumped simultaneously with the final rinse water. The delimer composition could also be injected for the first one or two seconds or could be injected over the entire final rinse step. Likewise, the delimer composition, and not water, could be pumped into the rinse arm. Or a short delivery of delimer composition into the rinse arm could be completed just before the final rinse step.

In a further embodiment, the methods of in the disclosure may also include the step of spraying the delimer composition simultaneously for a period of time, including a very brief period of time (i.e. a few seconds) with a final rinse water application. According to the embodiment, even a very brief simultaneous spray of the delimer composition and the rinse water causes additional residual acid in the final rinse step to beneficially lower the pH.

In a still further embodiment, the methods of in the disclosure may also include the step of injecting the delimer composition for a period of time, including a very brief period of time (i.e. a second or more) before the final rinse water application. According to the embodiment, even a very brief injection of the delimer composition before the application of the final rinse water causes additional residual acid in the final rinse step to beneficially lower the pH.

In some embodiments, the method involves providing the individual components of the delimer composition separately and mixing the individual components in situ with water to form a desired solution such as a wash solution, a sanitizing solution, or a rinse solution.

In some embodiments, the method involves providing a series of cleaning compositions together in a package, wherein some of the cleaning compositions are delimer compositions, and some of the cleaning compositions are alkaline compositions. In this embodiment, a user would clean and deliming a dish machine for a period of time using an alkaline composition, and then the user would switch to the deliming compositions.

The time for each step in the method may vary depending on the dish machine, for example if the dish machine is a consumer dish machine or an institutional dish machine. The time required for a cleaning step in consumer dish machines is typically about 10 minutes to about 60 minutes. The time required for the cleaning cycle in a U.S. or Asian institutional dish machine is typically about 45 seconds to about 2 minutes, depending on the type of machine. Each method step preferably lasts from about 2 seconds to about 30 minutes.

The temperature of the cleaning solutions in each step may also vary depending on the dish machine, for example if the dish machine is a consumer dish machine or an institutional dish machine. The temperature of the cleaning solution in a consumer dish machine is typically about 110° F. (43° C.) to about 150° F. (66° C.) with a rinse up to about 160° F. (71° C.). The temperature of the cleaning solution in a high temperature institutional dish machine in the U.S. is about typically about 150° F. (66° C.) to about 165° F. (74° C.) with a rinse from about 180° F. (82° C.) to about 195° F. (91° C.). The temperature in a low temperature institutional dish machine in the U.S. is typically about 120° F. (49° C.) to about 140° F. (60° C.). Low temperature dish machines usually include at least a thirty second rinse with a sanitizing solution. The temperature in a high temperature institutional dish machine in Asia is typically from about 131° F. (55° C.) to about 136° F. (58° C.) with a final rinse at 180° F. (82° C.).

The temperature of the cleaning solutions is preferably from about 95° F. (35° C.) to about 176° F. (80° C.).

When carrying out the method, the deliming composition may be inserted into a dispenser of a dish machine. The dispenser may be selected from a variety of different dispensers depending of the physical form of the composition. For example, a liquid composition may be dispensed using a pump, either peristaltic or bellows for example, syringe/plunger injection, gravity feed, siphon feed, aspirators, unit dose, for example using a water soluble packet such as polyvinyl alcohol, or a foil pouch, evacuation from a pressurized chamber, or diffusion through a membrane or permeable surface. If the composition is a gel or a thick liquid, it may be dispensed using a pump such as a peristaltic or bellows pump, syringe/plunger injection, caulk gun, unit dose, for example using a water soluble packet such as polyvinyl alcohol or a foil pouch, evacuation from a pressurized chamber, or diffusion through a membrane or permeable surface. Finally, if the composition is a solid or powder, the composition may be dispensed using a spray, flood, auger, shaker, tablet-type dispenser, unit dose using a water-soluble packet such as polyvinyl alcohol or foil pouch, or diffusion through a membrane or permeable surface. The dispenser may also be a dual dispenser in which one component, such as the acid component, is dispensed on one side and another component, such as the surfactant or antimicrobial agent, is dispensed on another side. These exemplary dispensers may be located in or associated with a variety of dish machines including under the counter dish machines, bar washers, door machines, conveyor machines, or flight machines. The dispenser may be located inside the dish machine, remote, or mounted outside of the dishwasher. A single dispenser may feed one or more dish machines.

Once the deliming composition is inserted into the dispenser, the wash cycle of the dish machine is started, and a wash solution is formed. The wash solution comprises the delimer composition and water from the dish machine. The water may be any type of water including hard water, soft water, clean water, or dirty water.

The method can include more steps or fewer steps than laid out here. For example, the method can include additional steps normally associated with a dish machine wash cycle.

Dish Machines

The method may be carried out in any consumer or institutional dish machine, including for example those described in U.S. Pat. No. 8,092,613, which is incorporated herein by reference in its entirety, including all figures and drawings. Some non-limiting examples of dish machines include door machines or hood machines, conveyor machines, undercounter machines, glasswashers, flight machines, pot and pan machines, utensil washers, and consumer dish machines. The dish machines may be either single tank or multi-tank machines. In a preferred embodiment, the dish machine is made out of acid resistant material, especially when the portions of the dish machine that contact the delimer composition do not also contact the alkaline composition.

A door dish machine, also called a hood dish machine, refers to a commercial dish machine wherein the soiled dishes are placed on a rack and the rack is then moved into the dish machine. Door dish machines clean one or two racks at a time. In such machines, the rack is stationary, and the wash and rinse arms move. A door machine includes two sets arms, a set of wash arms and a rinse arm, or a set of rinse arms.

Door machines may be a high temperature or low temperature machine. In a high temperature machine, the dishes are sanitized by hot water. In a low temperature machine, the dishes are sanitized by the chemical sanitizer. The door machine may either be a recirculation machine or a dump and fill machine. In a recirculation machine, the detergent solution is reused, or "recirculated" between wash cycles. The concentration of the detergent solution is adjusted between wash cycles so that an adequate concentration is maintained. In a dump and fill machine, the wash solution is not reused between wash cycles. New detergent solution is added before the next wash cycle. Some non-limiting examples of door machines include the Ecolab Omega HT, the Hobart AM-14, the Ecolab ES-2000, the Hobart LT-1, the CMA EVA-200, American Dish Service L-3DW and HT-25, the Autochlor A5, the Champion D-HB, and the Jackson Tempstar.

The methods may be used in conjunction with any of the door machines described above. When the methods are used in a door machine, the door machine may need to be modified to accommodate the delimer step. The door machine may be modified in one of several ways. In one embodiment, the delimer composition may be applied to the dishes using the rinse spray arm of the door machine. In this embodiment, the rinse spray arm is connected to a reservoir for the delimer composition. The delimer composition may be applied using the original nozzles of the rinse arm. Alternatively, additional nozzles may be added to the rinse arm for the delimer composition. In another embodiment, an additional rinse arm may be added to the door machine for the delimer composition. In yet another embodiment, spray nozzles may be installed in the door machine for the delimer composition. In a preferred embodiment, the nozzles are installed inside the door machine in such a way as to provide full coverage to the dish rack.

All publications and patent applications in this specification are indicative of the level of ordinary skill in the art to which this disclosure pertains. All publications and patent applications are herein incorporated by reference to the same extent as if each individual publication or patent application was specifically and individually indicated as incorporated by reference.

EXAMPLES

Embodiments of the present disclosure are further defined in the following non-limiting Examples. It should be understood that these Examples, while indicating certain embodiments of the disclosure, are given by way of illustration only. From the above discussion and these Examples, one skilled in the art can ascertain the essential characteristics of this disclosure, and without departing from the spirit and scope thereof, can make various changes and modifications of the embodiments of the disclosure to adapt it to various usages and conditions. Thus, various modifications of the embodiments of the disclosure, in addition to those shown and described herein, will be apparent to those skilled in the art from the foregoing description. Such modifications are also intended to fall within the scope of the appended claims.

For the first test the above formulation was used with the same quantity of Calcium Carbonate powder (0.5 g) added to 50 mL of a 1% solution of a commercial unbuffered acidic formula, the buffered PPE free formulation of the disclosure and a commercial strong acid liquid delimer. After stirring at room temperature, the unreacted $CaCO_3$ was filtered from solution, washed with water, dried in an oven, and recollected. The amount of recollected $CaCO_3$ was used to calculate the amount dissolved, and thereby the percent of the $CaCO_3$ dissolved by each product. The numerical results are below are reported as percentage of $CaCO_3$ dissolved.

| Mass CaCO3 Dissolved | | |
|---|---|---|
| 1% | Unbuffered PPE Free | 22.93 |
| 1% | Buffered PPE Free | 45.98 |
| 1% | Strong Acid Liquid Delimer | 39.21 |
| 1% | Solid tablet delimer | 20.76 |

Figure 2:
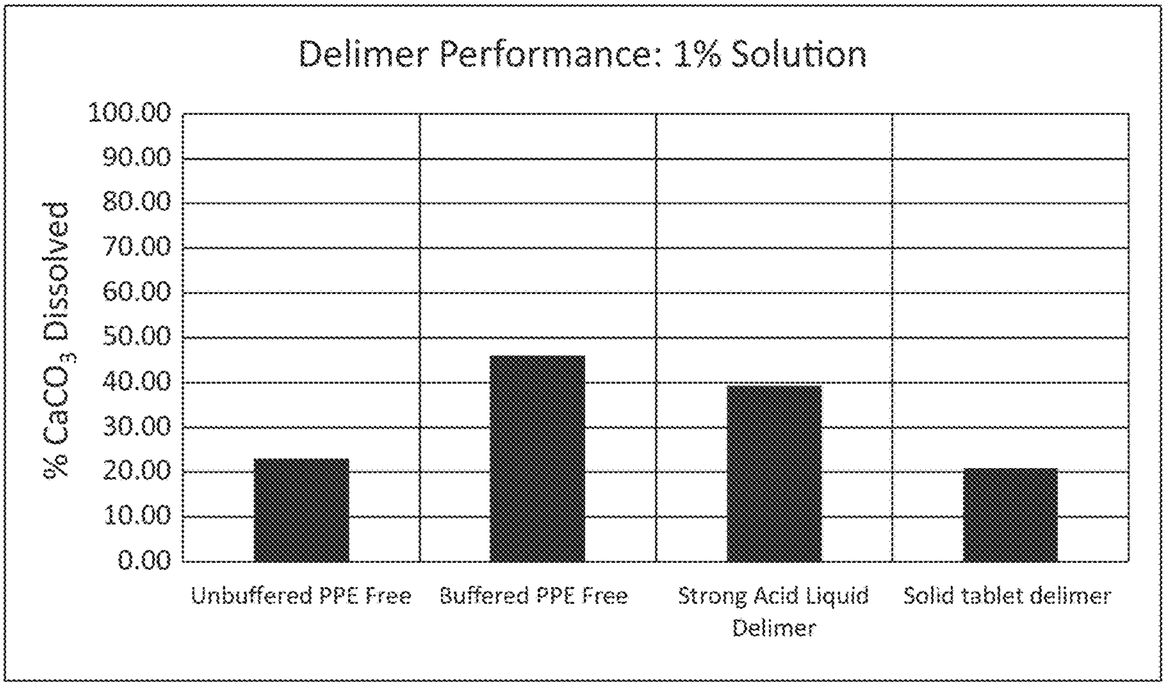
FIG. 2 is a graph unreacted $CaCO_3$ after addition of the same amount of calcium carbonate powder (0.5 g) was added to 50 mL of 1% solution of each product. After stirring, unreacted $CaCO_3$ was filtered, dried and measured. The solid tablet delimer was dissolved according to manufacturer instructions, and then an aliquot was diluted to a concentration of 1%.

In the case of a 1% solution the performance of the buffered PPE free formula was seen to be nearly identical to the strong acid liquid deliming option requiring PPE. The results are depicted graphically in FIG. 2.

Example 2

In this test the same quantity of Calcium Carbonate ($CaCO_3$) powder (0.5 g) was added to 50 mL aliquot of a 10% solution of each product. After stirring at room temperature, the unreacted $CaCO_3$ was filtered from solution, washed with water, dried in an oven, and recollected. The amount of recollected $CaCO_3$ was used to calculate the amount dissolved, and thereby the percent of the $CaCO_3$ dissolved by each product.

The numerical results are below are reported as percentage of $CaCO_3$ dissolved:

| Mass CaCO3 Dissolved | | |
|---|---|---|
| 10% | Unbuffered PPE Free | 25.82 |
| 10% | Buffered PPE Free | 100.00 |
| 10% | Strong Acid Liquid Delimer | −12.59 |
| 1% | Solid tablet delimer | 48.71 |

Figure 3:
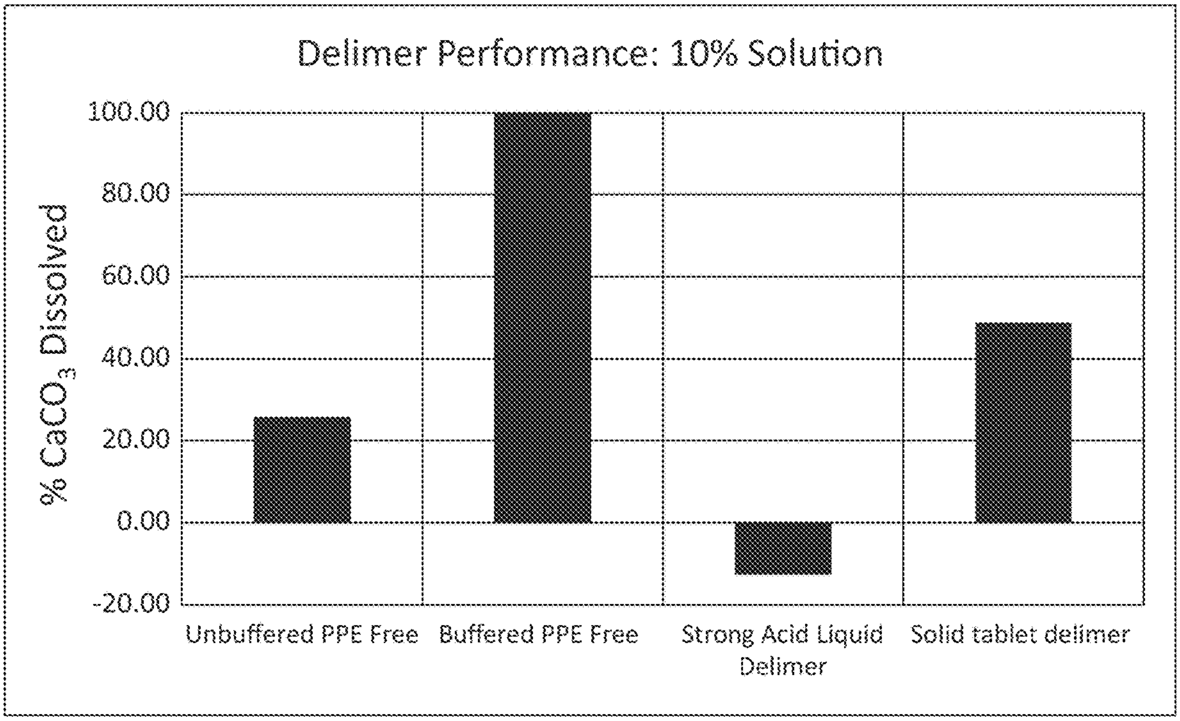
FIG. 3 is a graph showing results of the same test with 10% solution of each product.

FIG. 3 depicts the results graphically. For a 10% solution the performance of the PPE free formula was clearly the best of the three products tested. For the liquid deliming formula more precipitate was recollected than was added initially due to the formation of insoluble calcium salts leading to a negative percent dissolved.

Example 3

In this test the same quantity of Calcium Carbonate powder (0.5 g) was added to 10 mL of water, in separate beakers. While stirring at room temperature, the 10% solutions of each product were added portion wise to each beaker. The volume required to fully dissolve the $CaCO_3$ was recorded. The results are below.

| Volume to dissolve 1 g CaCO3 | | |
|---|---|---|
| 10% | Unbuffered acidic formula | 500 |
| 10% | Buffered PPE Free | 38 |
| 10% | Strong Acid liquid delimer | 25 |

Figure 4:
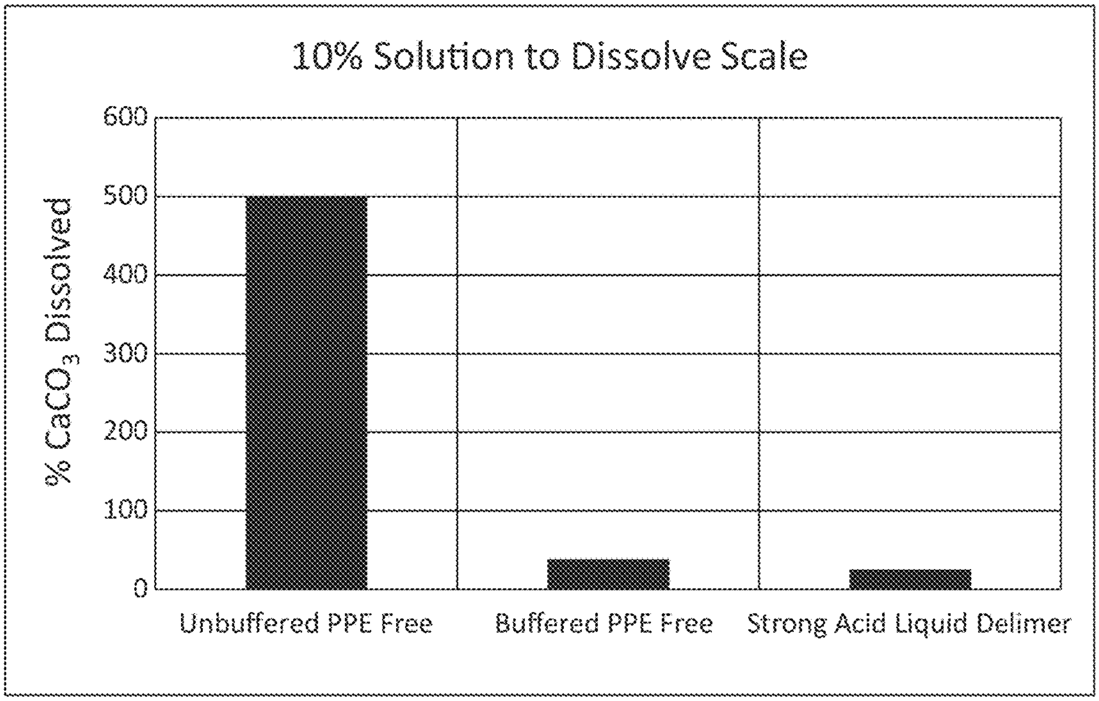
FIG. 4 is a graph showing the results of a test where the same quantity of Calcium Carbonate powder (0.5 g) was added to 10 mL of water, in separate beakers. While stirring at room temperature, the 10% solutions of each product were added portion wise to each beaker. The volume required to fully dissolve the CaCO3 was recorded and graphed.

For the unbuffered acidic formula 500 mL of solution was added, but complete dissolution was not obtained. The buffered PPE-free formula required about 38 mL of 10% solution, and the liquid delimer required about 25 mL for dissolution. In the case of the liquid delimer the end point is difficult to discern due to the precipitation of the calcium salts as noted in the previous experiment. The results are depicted in FIG. 4.

Example 4

Figure 5:
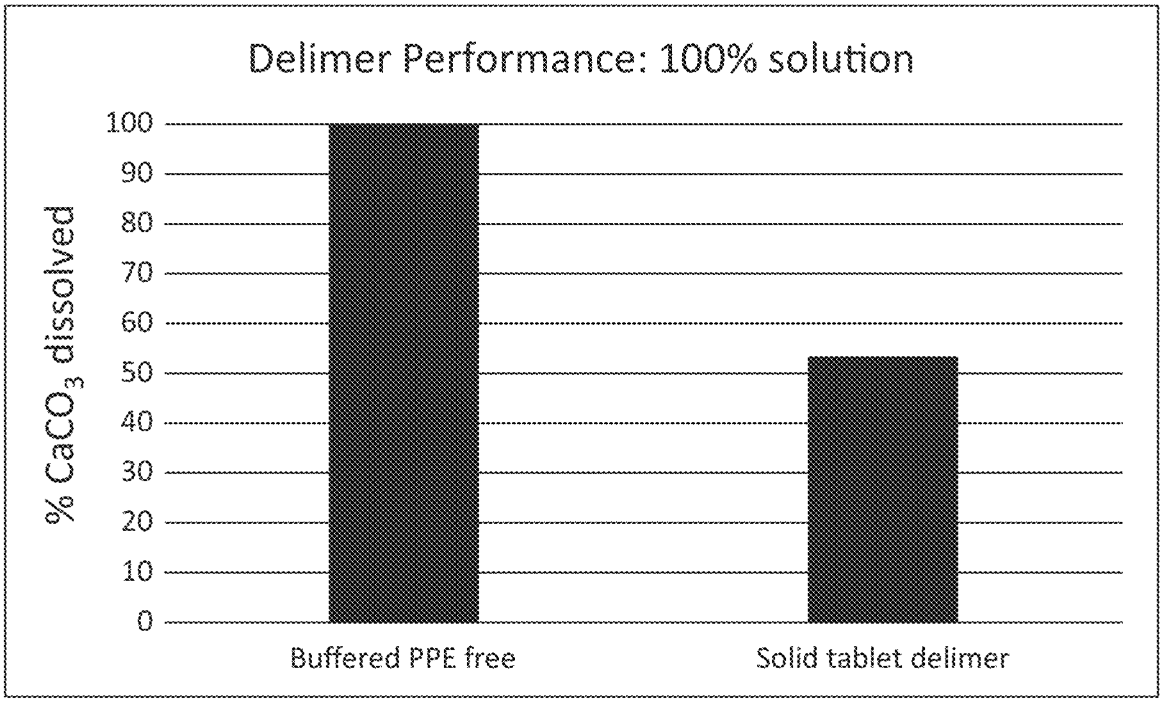
FIG. 5 is a graph unreacted $CaCO_3$ after addition of the same amount of calcium carbonate powder (5 g) was added to 100 mL of undiluted solution of each product. After stirring, unreacted $CaCO_3$ was filtered, dried and measured. The solid tablet delimer was dissolved according to manufacturer instructions.

In the next example the PPE free liquid delimer disclosed herein tested against a solid tablet delimer. Calcium Carbonate powder (5 g) was added to 100 mL of undiluted solution of each product. The solid tablet delimer was diluted according to the listed manufacturer recommended concentration and used as prepared. The results are depicted in FIG. 5. The buffered PPE free liquid delimer outperformed the solid tablet delimer.

Example 5

| Name | % |
|---|---|
| Water | 52.799 |
| Sodium Citrate dihydrate | 3.5 |
| Citric Acid 50% | 23 |
| Surfactant/preservative/dye | 0.201 |

| Name | RT appearance | 120° F. appearance |
|---|---|---|
| SLF180 (Alkyl-(EO)n-(PO)n-POH) | Hazy | Hazy |
| Pluronic 10R5 (Polypropylene glycol)-block-poly(ethylene | Clear | Clear |

-continued

| Name | RT appearance | 120° F. appearance |
|---|---|---|
| glycol)-block-poly(propylene glycol)) | | |
| Plurafac RA300 (alcohol alkoxylate) | Clear | Hazy |
| Pluronic 17R4 (Polypropylene glycol)-block-poly(ethylene glycol)-block-polypropylene glycol)) | Clear | Clear |
| Pluronic 25R2 (PO-EO-PO) | Clear | Hazy |

For the next series of tests different commercially available non-ionic surfactants were tested at room temperature and at 120° F. With less citric acid and sodium citrate, other surfactants may be miscible at room temperature as well as high temperature.

Only 10R5 and 17R4 remained as clear solutions at both temperature conditions.

The disclosures being thus described, it will be obvious that the same may be varied in many ways. Such variations are not to be regarded as a departure from the spirit and scope of the disclosures and all such modifications are intended to be included within the scope of the following claims. The above specification provides a description of the manufacture and use of the disclosed compositions and methods. Since many embodiments can be made without departing from the spirit and scope of the disclosure, the disclosure resides in the claims.

What is claimed is:

1. A liquid deliming composition comprising:

from 25 wt. % to about 35 wt. % of citric acid;

from about 0.1 wt % to about 20 wt. % of surfactant;

a pH modifier in an amount so that the amount of free citric acid is less than 10%, wherein said pH modifier is sodium citrate dihydrate;

a preservative; and from about 35 wt. % to about 65 wt. % of water;

wherein said composition is free of alkali metal hydroxides and alkanolamines.

2. The composition of claim 1 wherein said composition is free of chelants.

3. The composition of claim 2 wherein said composition is free of MGDA, GLDA, glutamic acid, and mixtures thereof.

4. The composition of claim 1 wherein said composition is free of builders.

5. The composition of claim 1 wherein said surfactant is a nonionic surfactant.

6. The composition of claim 1 wherein in said composition has a pH of from about 2 to about 7.

7. The composition of claim 1 wherein said pH modifier is present in an amount of from about 0.01 wt. % to about 20 wt. %.

8. The composition of claim 1 further comprising a crystal modifier.

9. The composition of claim 8 wherein said crystal modifier is present in an amount of from about 0.001 wt. % and about 12 wt. %.

10. The composition of claim 1 wherein composition may be transported free of DOT restrictions.

11. A method of removing scale deposits from a dish machine comprising:

applying a liquid deliming composition comprising:

from 25 wt. % to about 35 wt. % of citric acid;

from about 0.1 wt % to about 20 wt. % of surfactant;

a pH modifier in an amount so that the amount of free citric acid is less than 10%, wherein said pH modifier is sodium citrate dihydrate;

a preservative; and from about 35 wt. % to about 65 wt. % of water to said dish machine; and thereafter rinsing said dish machine, without the need for personal protective equipment, wherein said composition is free of alkali metal hydroxides and alkanolamines.

12. The method of claim 11, wherein no phosphorus or phosphorus-containing compounds are employed.

13. The method of claim 11, wherein the dish machine is an institutional dish machine or a consumer dish machine.

14. The method of claim 11, wherein the dish machine is selected from the group consisting of a door dish machine, a hood dish machine, a conveyor dish machine, an undercounter dish machine, a glasswasher, a flight dish machine, a pot and pan dish machine, and a utensil washer.

15. A method of cleaning a metal surface to remove hard water deposits and/or lime comprising:

providing a liquid composition, comprising from 25 wt. % to about 35 Wt. % of citric acid;

from about 0.1 wt % to about 20 wt. % of surfactant;

a pH modifier in an amount so that the amount of free citric acid is less than 10%, wherein said pH modifier is sodium citrate dihydrate;

a preservative; and from about 35 wt. % to about 65 wt. % of water;

wherein said composition is free of alkali metal hydroxides and alkanolamines and further wherein the method does not require the use of personal protective equipment.

16. The method of claim 15 wherein said composition is free of phosphorus containing chelants.

17. The method of claim 15 wherein said composition is free of builders.

* * * * *